United States Patent [19]
Coffey et al.

[11] Patent Number: 5,909,987
[45] Date of Patent: Jun. 8, 1999

[54] ADJUSTABLE SUB-BASE FOR FIXED-BASE ROUTER

[75] Inventors: John R. Coffey; Lawrence M. Cotton, both of New Bern, N.C.; Carl Christian Carlson, Vernon Hills, Ill.

[73] Assignee: S-B Power Tool Company, Chicago, Ill.

[21] Appl. No.: 09/103,409

[22] Filed: Jun. 24, 1998

[51] Int. Cl.[6] .................................................. B23C 1/20
[52] U.S. Cl. ...................... 409/131; 144/136.95; 409/182
[58] Field of Search ................................. 409/131, 181, 409/182; 33/628, 641; 144/136.95

[56] References Cited

U.S. PATENT DOCUMENTS

| | | | |
|---|---|---|---|
| 1,899,883 | 2/1933 | Sacrey | 144/136.95 |
| 4,652,191 | 3/1987 | Bernier | 409/182 |
| 5,016,691 | 5/1991 | Bernier | 409/182 |

*Primary Examiner*—Daniel W. Howell
*Attorney, Agent, or Firm*—Jones, Day, Reavis & Pogue

[57] ABSTRACT

A simple and quick manner for centering a sub-base of a fixed-base router. The sub-base is provided with two sets of peripheral holes and a large central opening. One set of holes is countersunk and receives flat-head screws; the other set of holes is counterbored and receives pan-head screws. The router is sent from the factory with the sub-base attached by the flat-head screws. To center the sub-base the flat-head screws are removed and the pan-head screws are inserted to loosely mount the sub-base. The counterbored openings are oversized to allow lateral movement of the sub-base. A cone element is installed in the collet and engaged with the sub-base through the central opening. The cone element fully abuts the opening to center the sub-base, the pan-head screws are tightened and the cone element is replaced by a router bit.

12 Claims, 2 Drawing Sheets

ADJUSTABLE SUB-BASE FOR FIXED-BASE ROUTER

BACKGROUND OF THE INVENTION

1. Field of the Invention

The present invention relates to a sub-base for a fixed-base router and more particularly to a sub-base which may be easily and quickly centered relative to the router.

2. Description of the Related Art

Operators of fixed-base routers are always concerned about the concentricity of the sub-base relative to the router and particularly to the router bit. Because a router must be precisely located to ensure the correctness of the expected cut, there is usually a need to center the router sub-base relative to the router and thereby align perpendicular with a router bit.

Different methods and techniques have been developed in the past to center the sub-base but an optimal system has yet to be devised.

BRIEF DESCRIPTION OF THE INVENTION

The difficulties encounter by previous systems have been overcome by the present invention. What is described here, is a fixed-base router having an adjustable sub-base comprising a router having a base, a motor, and a collet; a sub-base removably connected to the base and having a central opening, a first set of peripheral openings to receive a set of flat-head screws, a second set of peripheral openings to receive a set of pan-head screws; a set of flat-head screws adapted to alternately connect the sub-base to the base; a set of pan-head screws adapted to alternately connect the sub-base to the base; and a cone element adapted to be connected to the collet and to engage the central opening of the sub-base whereby the sub-base may be centered.

The invention also includes a self-centering sub-base kit for a fixed base router comprising a sub-base having a central opening and first and second sets of peripheral openings, the first set of openings being countersunk and the second set of openings being counterbored; a set of flat-head screws adapted to be received by the first set of openings; and a set of pan-head screws adapted to be received by the second set of openings; and a cone element adapted to be mounted to the router for engaging the central opening of the sub-base for centering the sub-base.

The invention further includes a method for centering a sub-base relative to a fixed base router where the sub-base is connected to the router by a set of flat-head screws comprising the steps of providing the router, a router bit, a set of pan-head screws, a cone element adapted to be mounted to the router, and the router sub-base connected to the router with flat-head screws, the sub-base having a central opening and first and second sets of peripheral openings; removing the flat-head screws connecting the sub-base and the router through the first set of openings; loosely mounting the sub-base to the router with the pan-head screws through the second set of openings; connecting the cone to the router; engaging the cone and the central opening of the sub-base until the cone is centered in the central opening; tightening the pan-head screws to adjustably fix the sub-base to the router in the position located by the cone; removing the cone from the router; and connecting the bit to the router.

An object of the present invention is to provide a simple and inexpensive mechanism to center a sub-base of a fixed-base router. Another object of the present invention is to provide an adjustable sub-base for a router that may be centered easily and quickly. A further aspect of the present invention is to provide an adjustable sub-base for a fixed-base router which may be centered in a reliable manner.

A more complete understanding of the present invention and other objects, aspects, aims and advantages will be gained from a consideration of the following description of the preferred embodiment for read in conjunction with the accompanying drawings provided herein.

DESCRIPTION OF THE PREFERRED EMBODIMENT

Figure 1:
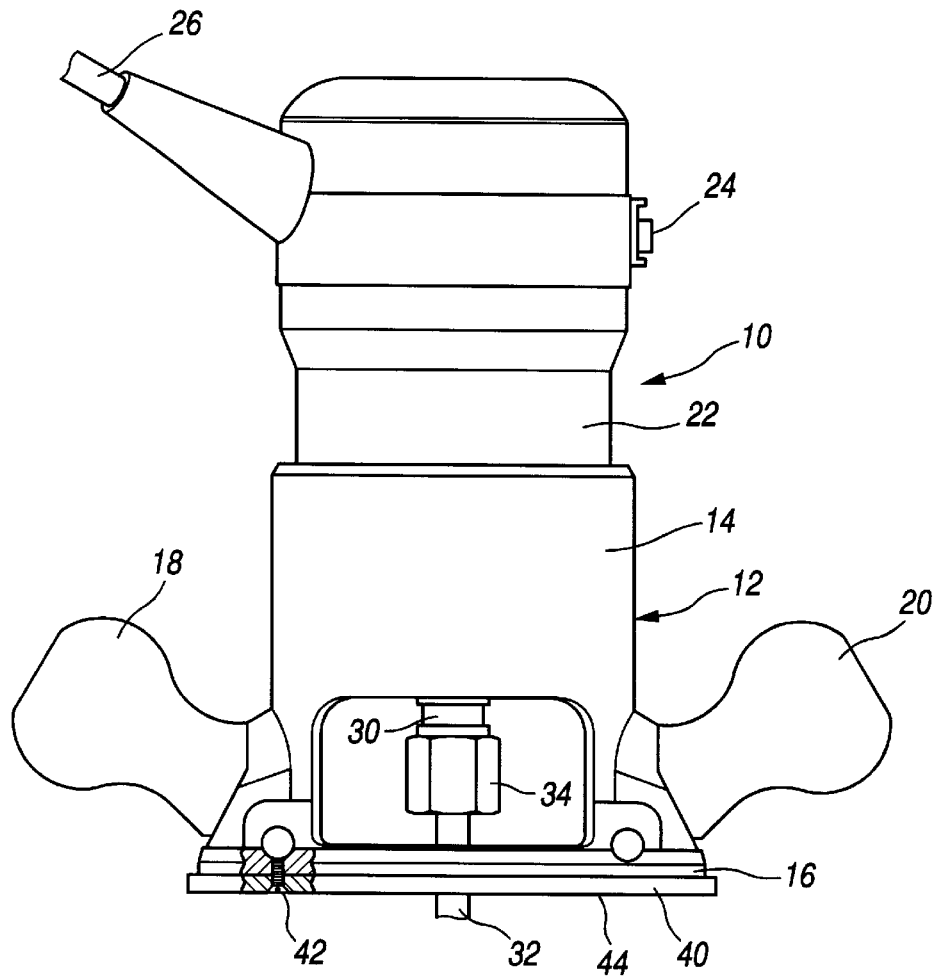
FIG. 1 is an elevational view of a fixed base router having an adjustable sub-base of the present invention.
Figure 2:
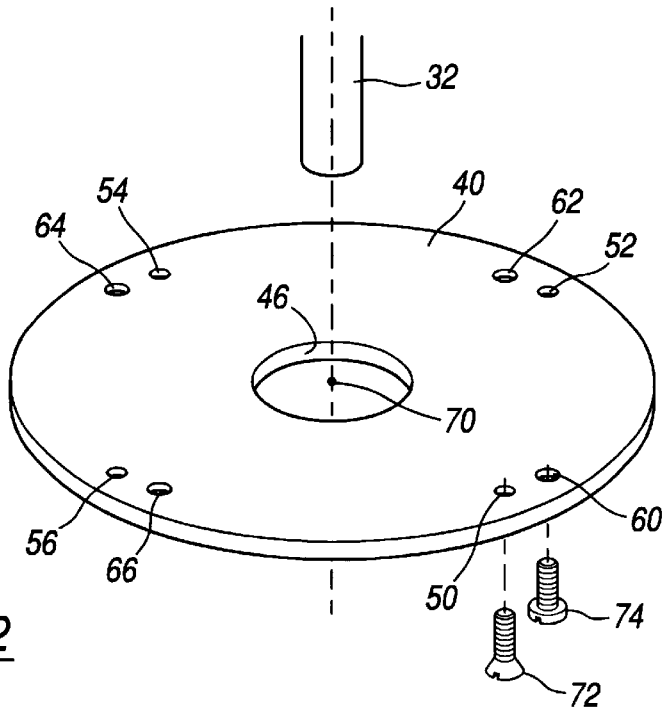
FIG. 2 is a partially exploded perspective view of the sub-base of the present invention.

While the present invention is open to various modifications and alternative constructions, the preferred embodiment shown in the drawings will be described herein in detail. It is to be understood, however, that there is no intention to limit the invention to the particular form disclosed. On the contrary, the intention is to cover all modifications, equivalent structures and methods, and alternative constructions falling within the spirit and scope of the invention as expressed in the appended claims.

The problem facing fixed-base router users regarding concentricity is simple and yet critical to the satisfactory operation of the router. There is a need to control concentricity between the sub-base of the router and a router bit because the circumference of the sub-base and any template guides, which may be attached to the base, are used as guide surfaces.

The basic parts of a router are illustrated in FIG. 1 and include a fixed-base router 10 having a base 12 divided into a body portion 14 and a foot portion 16. Attached to the base are two handles 18 and 20. A motor housing 22 is engaged in a telescoping fashion to the body portion 14. Within the motor housing is an electric motor (not shown) which is activated by an on/off rocker switch 24. The motor receives power from a typical electrical source (not shown) through an electrical cord 26. A clamp and/or screw mechanism (neither of which is shown) may be used for adjusting the relative relationship between the base 12 and the motor housing 22. An output shaft 30 is connected to the motor housing and is driven by the motor to rotate a router bit 32 attached to the output shaft by a collet 34, all in typical fashion.

A sub-base 40 is fastened by flat head screws, such as a screw 42, to the foot portion 16 of the base. It is critical that the bottom surface 44 be perpendicular to the bit 32 and be perfectly centered in order to prevent wasted stock and guess work. The factory mounting of the sub-base 40 to the router is accurate, but yet still an approximation. The mounting of the sub-base is also important because it provides a connection for template sets, dove-tail jigs, mortising templates, and other router accessories. In spite of this, prior routers did not appear to provide any simple mechanism to adjust concentricity.

The simplicity of the present invention may be seen by referring to FIGS. 2–5. The invention includes the concept of factory mounting the sub-base by one set of openings and allowing adjustment of the sub-base by using a set of adjacent openings. The sub-base 40 includes a central opening 46, a first set of peripheral openings in the form of countersunk holes 50, 52, 54, and 56, and a second set of peripheral openings in the form of counterbored holes 60, 62, 64, and 66. It is noted that these two sets of holes are spaced equally in a radial direction from a center point 70, however, the first and second sets of holes are angularly offset one from the other. Both sets of holes may be molded into the sub-base.

Figure 3:
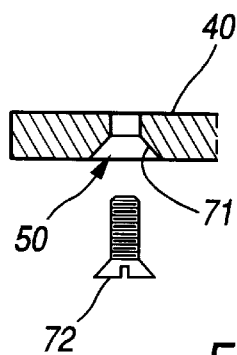
FIG. 3 is an exploded sectional elevational view of a portion of the sub-base illustrating a countersunk hole and a flat-head screw.
Figure 4:
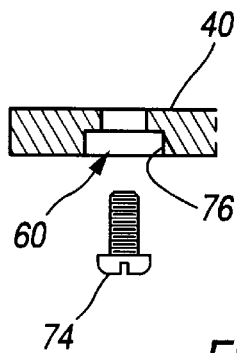
FIG. 4 is an exploded sectional elevational view of a portion of the sub-base illustrating a counterbored hole and a pan-head screw.

The reason for the two sets of holes, may be explained by reference to FIGS. 3 and 4. As can be seen in these sectional views, the hole of FIG. 3 is countersunk, while the hole in FIG. 4 is counterbored. The countersunk holes, such as the hole 50, have a funnel-shaped enlargement 71 at the outer end of each drilled hole. These are formed to snugly receive flat-head screws, such as the screw 72. Adjustment of the sub-base cannot be accomplished without removal of the flat-head screws. The counterbored holes, such as the hole 60, are made to receive pan-head screws such as the screw 74. Moreover, however, while the countersunk holes are arranged to fit the flat-head screws snugly, the same is not the case with the counterbored holes. The counterbored hole includes an upper part 76 that is enlarged cylindrically to a specified diameter and depth. The upper part 76 is made oversized when compared to the head of the pan-head screw so that there is some horizontal adjustability (when viewed in FIG. 4) to the sub-base when it is attached to the fixed-base router with the pan-head screws as opposed to a lack of adjustability when the sub-base is attached with the flat-head screws.

Figure 5:
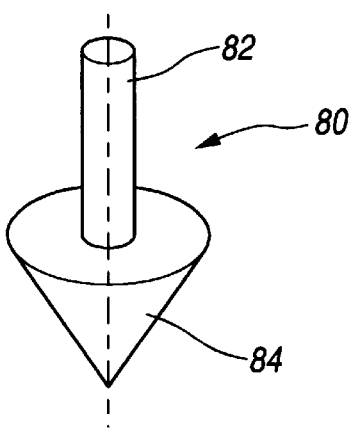
FIG. 5 is a perspective view of a centering cone of the present invention.

Referring now to FIG. 5, there is shown a cone element 80 having a shaft 82 and a conical surface 84. The shaft 82 allows the cone element to be connected to the collet 34 and thereby attached to the output shaft. The cone takes the place of a router bit, such as the bit 32. When this is done and the motor housing is telescoped downwardly relative to the base of the router, the conical surface 84 engages the periphery of the opening 46 of the sub-base. As engagement continues, the conical surface, as it moves downwardly in a vertical direction, will automatically cause the sub-base to adjust itself laterally (or in a horizontal direction) so as to be precisely centered about the conical surface. This centering also means that the sub-base is centered as to the center line of the output shaft 30 and centered as to any router bit which is installed in the collet 34.

Figure 6:
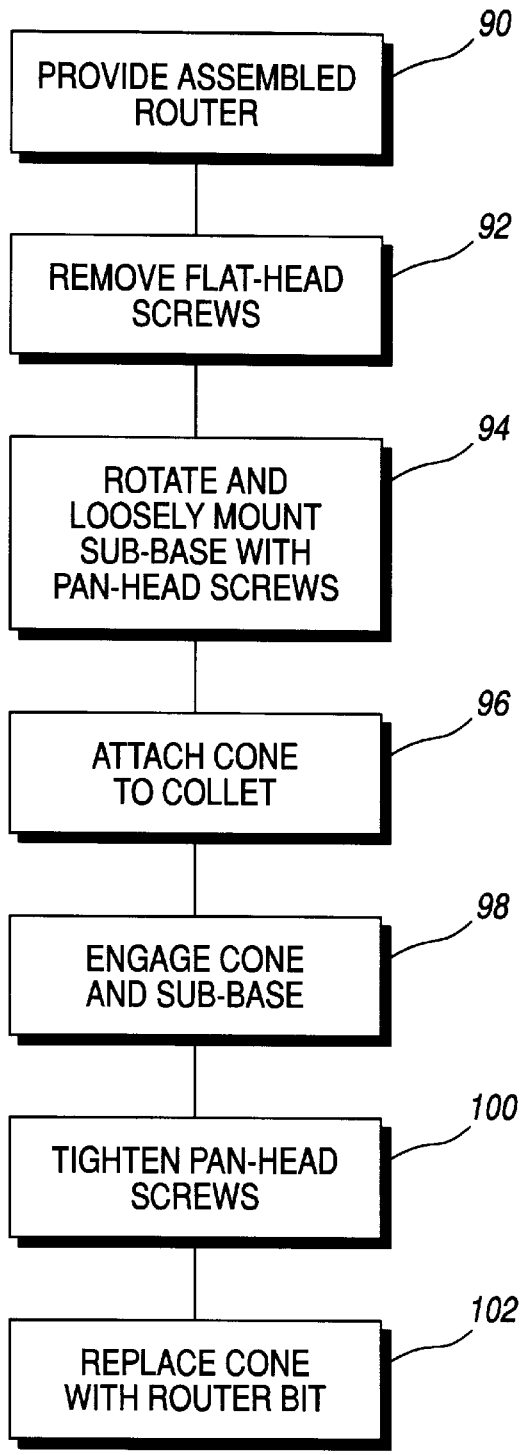
FIG. 6 is a block diagram describing the present inventive method for centering the sub-base.

In operation, the method for centering the sub-base may be seen by referring now to FIG. 6. Typically, a fixed-base router arrives from the factory with a sub-base that is attached to the router using the flat-head screws, as shown by box 90. To allow a user to center the sub-base, the flat-head screws are removed, as shown by box 92, the sub-base is rotated slightly to align the oversized counterbored holes with the openings in the foot portion 16 and four pan-head screws are used to loosely mount the sub-base to the foot portion, as shown by box 94. The next step, box 96, includes attaching the cone to the collet in the usual fashion that an operator attaches a router bit.

Next, the motor housing is moved relative to the body portion 14 by vertical movement, that is, the motor housing is lowered relative to the body portion, as shown by box 98. This vertical movement has the conical surface 84 engage the periphery of the central opening 46 causing the sub-base to adjust itself by engaging the conical surface through 360°. After this happens, the pan-head screws are tightened to fix the sub-base relative to the router, as shown in box 100. It is now appreciated that the oversized counterbored holes allow for slight lateral or horizontal movement of the sub-base whereby precise centering is easily accomplished. Thereafter, the cone is raised away and removed from the collet and a router bit is installed in the usual manner, as shown by box 102. This method allows adjustment so that the sub-base is precisely concentric to the router bit.

The specification describes in detail an embodiment of the present invention. Other modifications and variations will, under the doctrine of equivalents, come within the scope of the appended claims. For example, having a larger or smaller central opening for the sub-base and an equivalent larger or smaller conical surface for the cone, are considered equivalent structures. Also, the manner of attaching the sub-base to the foot portion, whether by four pan-head screws or more or less screws or even other types of adjustable fasteners are considered equivalent structures. Still other alternatives will also be equivalent, as will many new technologies. There is no desire or intention here to limit in any way the application of the doctrine of equivalents.

We claim:

1. A fixed-base router having an adjustable sub-base comprising:

a router having a base, a motor and a collet;

a sub-base removably connected to said base and having a central opening, a first set of peripheral openings for receiving a set of flat-head screws and a second set of peripheral openings for receiving a set of pan-head screws;

a set of flat-head screws adapted to alternately connect said sub-base to said base;

a set of pan-head screws adapted to alternately connect said sub-base to said base; and a cone element having a diameter larger than the diameter of said central opening of said sub-base, said cone element adapted to be connected to said collet and to engage said central opening of said sub-base whereby said sub-base may be centered.

2. An apparatus as claimed in claim 1 wherein:

said second set of peripheral openings are each angularly shifted from each of said first set of peripheral openings.

3. An apparatus as claimed in claim 2 wherein:

said second set of peripheral openings are counterbored holes having an oversized upper portion to accommodate the heads of said pan-head screws.

4. An apparatus as claimed in claim 3 wherein:

said first set of openings are a set of countersunk holes.

5. An apparatus as claimed in claim 4 wherein:

each counterbored holes is the same number of degrees away from a corresponding countersunk hole.

6. A self-centering sub-base kit for a fixed-base router comprising:

a sub-base having a central opening and first and second sets of peripheral openings, said first set of openings being countersunk and said second set of openings being counterbored;

a set of flat-head screws adapted to be received by said first set of openings;

a set of pan-head screws adapted to be received by said second set of openings; and a cone adapted to be mounted to said router for engaging said central opening of said sub-base for centering said sub-base.

7. A kit as claimed in claim 6 wherein:

each of said first set of openings is spaced from a corresponding opening of said second set of openings by a constant angular measurement.

8. A kit as claimed in claim 7 wherein:

each of said counterbored openings includes a through hole and an oversized counterbore.

9. A method for centering a sub-base relative to a fixed-base router where said sub-base if originally connected to said router by a set of flat-head screws comprising the steps of:

providing said fixed-base router, a set of pan-head screws, a cone element adapted to be mounted to said router and said router sub-base being connected to said router with flat-head screws, said sub-base having a central opening and first and second sets of peripheral openings;

removing said flat-head screws connecting said sub-base and said router through said first set of openings;

loosely mounting said sub-base to said router with said pan-head screws through said second set of openings;

connecting said cone element to said router;

engaging said cone element and said central opening of said sub-base until said cone element is centered in said central opening;

tightening said pan-head screws to adjustably fix said sub-base to said router in the position located by said cone element;

removing said cone element from said router; and connecting router bit to said router.

10. A method as claimed in claim 9 wherein:

second set of openings are counterbored holes.

11. A method as claimed in claim 10 including the step of:

rotating said sub-base after removing said flat-head screws and before using said pan-head screws.

12. A fixed-base router having an adjustable sub-base comprising:

a router having a base, a motor and a collet;

a sub-base removably connected to said base and having a central opening, a first set of peripheral openings for receiving a first set of fasteners and a second set of peripheral openings for receiving a second set of fasteners;

a first set of fasteners adapted to initially connect said sub-base to said base;

a second set of fasteners adapted to connect said sub-base to said base when said sub-base is being centered; and a cone element having a diameter larger than the diameter of said central opening of said sub-base, said cone element adapted to be connected to said collet and to engage said central opening of said sub-base whereby said sub-base is centered on said cone element.

* * * * *